US 9,604,666 B2

(12) United States Patent
Nakayama et al.

(10) Patent No.: US 9,604,666 B2
(45) Date of Patent: Mar. 28, 2017

(54) ELECTRIC POWER STEERING APPARATUS (71) Applicant: NSK LTD., Tokyo (JP)

(72) Inventors: Sachio Nakayama, Maebashi (JP);
Toru Sakaguchi, Maebashi (JP);
Yuzuru Hoshi, Maebashi (JP); Shinichi Tanaka, Maebashi (JP); Masanori Shingou, Maebashi (JP)

(73) Assignee: NSK LTD., Tokyo (JP)

(*) Notice: Subject to any disclaimer, the term of this patent is extended or adjusted under 35 U.S.C. 154(b) by 14 days.

(21) Appl. No.: 14/777,547

(22) PCT Filed: Mar. 18, 2013

(86) PCT No.: PCT/JP2013/057599
§ 371 (c)(1),
(2) Date: Sep. 16, 2015

(87) PCT Pub. No.: WO2014/147694
PCT Pub. Date: Sep. 25, 2014

(65) Prior Publication Data
US 2016/0052541 A1    Feb. 25, 2016

(51) Int. Cl.
*B62D 5/04* (2006.01)
(52) U.S. Cl.
CPC ......... *B62D 5/0463* (2013.01); *B62D 5/0481* (2013.01)
(58) Field of Classification Search
CPC .......................... B62D 5/0463; B62D 5/0481
(Continued)

(56) References Cited

U.S. PATENT DOCUMENTS 6,002,226 A * 12/1999 Collier-Hallman ....... H02P 6/10
                                                          318/139
6,448,724 B1 * 9/2002 Kleinau .................. B62D 5/046
                                                          318/139
(Continued)

FOREIGN PATENT DOCUMENTS

JP          3-86094 A      4/1991
JP      2005-193751 A      7/2005
(Continued)

OTHER PUBLICATIONS

International Search Report for PCT/JP2013/057599 dated Jun. 18, 2013.

*Primary Examiner* — Tyler J Lee
(74) *Attorney, Agent, or Firm* — Sughrue Mion, PLLC (57) ABSTRACT An electric power steering apparatus that protects Zener diodes without impairing steering performances by time-integrating a loss power of the Zener diodes for protecting FETs and gradually limiting a duty ratio with an increase in an integrating loss. The apparatus includes a loss power calculating section that calculates a loss power when a difference between an ignition voltage and an inverter applying voltage is equal to or more than a predetermined voltage; an integrating loss calculating section to calculate an integrating loss of the loss power; a permissible loss calculating section to calculate a permissible loss based on a temperature; a minimum value selecting section to select a minimum value of a loss difference of the permissible loss and the integrating loss; and a limit value calculating section to calculate a limit value of the PWM-signal based on the minimum value of the loss difference and the permissible loss.

11 Claims, 7 Drawing Sheets (58) Field of Classification Search
USPC .................................................. 701/41–44
See application file for complete search history.

(56) References Cited

U.S. PATENT DOCUMENTS

| | | | | |
|---|---|---|---|---|
| 6,795,762 | B2* | 9/2004 | Itoh | B62D 5/049 |
| | | | | 180/421 |
| 7,031,813 | B2* | 4/2006 | Sugiyama | B62D 5/0496 |
| | | | | 180/446 |
| 7,129,663 | B2* | 10/2006 | Suzuki | B62D 5/046 |
| | | | | 180/6.44 |
| 7,345,442 | B2* | 3/2008 | Ta | B62D 5/046 |
| | | | | 180/446 |
| 7,389,851 | B2* | 6/2008 | Miyaura | B62D 5/0481 |
| | | | | 180/443 |
| 8,989,965 | B2* | 3/2015 | Abe | B62D 5/0481 |
| | | | | 701/36 |
| 2004/0027757 | A1* | 2/2004 | Minatani | B60L 3/0023 |
| | | | | 361/91.1 |
| 2004/0200663 | A1* | 10/2004 | Kifuku | B62D 5/046 |
| | | | | 180/443 |
| 2008/0024080 | A1 | 1/2008 | Ogawa | |
| 2009/0071745 | A1* | 3/2009 | Itakura | B62D 5/0481 |
| | | | | 180/446 |
| 2011/0231064 | A1* | 9/2011 | Abe | B62D 5/0463 |
| | | | | 701/41 |
| 2012/0306416 | A1 | 12/2012 | Hano | |

FOREIGN PATENT DOCUMENTS

| | | |
|---|---|---|
| JP | 2007-290429 A | 11/2007 |
| JP | 2008-54440 A | 3/2008 |
| JP | 2012-196084 A | 10/2012 |
| JP | 2012-253844 A | 12/2012 |
| WO | 2011/102028 A1 | 8/2011 |

* cited by examiner

FIG.1

PRIOR ART

PRIOR ART

ELECTRIC POWER STEERING APPARATUS

CROSS REFERENCE TO RELATED APPLICATIONS

This application is a National Stage of International Application No. PCT/JP2013/057599 filed Mar. 18, 2013, the contents of which are incorporated herein by reference in their entirety.

TECHNICAL FIELD

The present invention relates to an electric power steering apparatus that provides a steering system of a vehicle with an assist force generated by a motor, and in particular to an electric power steering apparatus that is capable of certainly protecting Zener diodes mounted on an FET bridge circuit without impairing steering performances by limiting a duty ratio even when a power-source voltage (a battery voltage) decreases.

BACKGROUND ART

An electric power steering apparatus which provides a steering mechanism of a vehicle with a steering assist torque (an assist torque) by means of a rotational torque of a motor, applies a driving force of the motor as the assist torque to a steering shaft or a rack shaft by means of a transmission mechanism such as gears or a belt through a reduction mechanism. In order to accurately generate the assist torque, such a conventional electric power steering apparatus performs a feedback control of a motor current. The feedback control adjusts a voltage supplied to the motor so that a difference between a steering assist command value (a current command value) and a detected motor current value becomes small, and the adjustment of the voltage applied to the motor is generally performed by an adjustment of the duty ratio of a PWM (Pulse Width Modulation) control.

Figure 1:
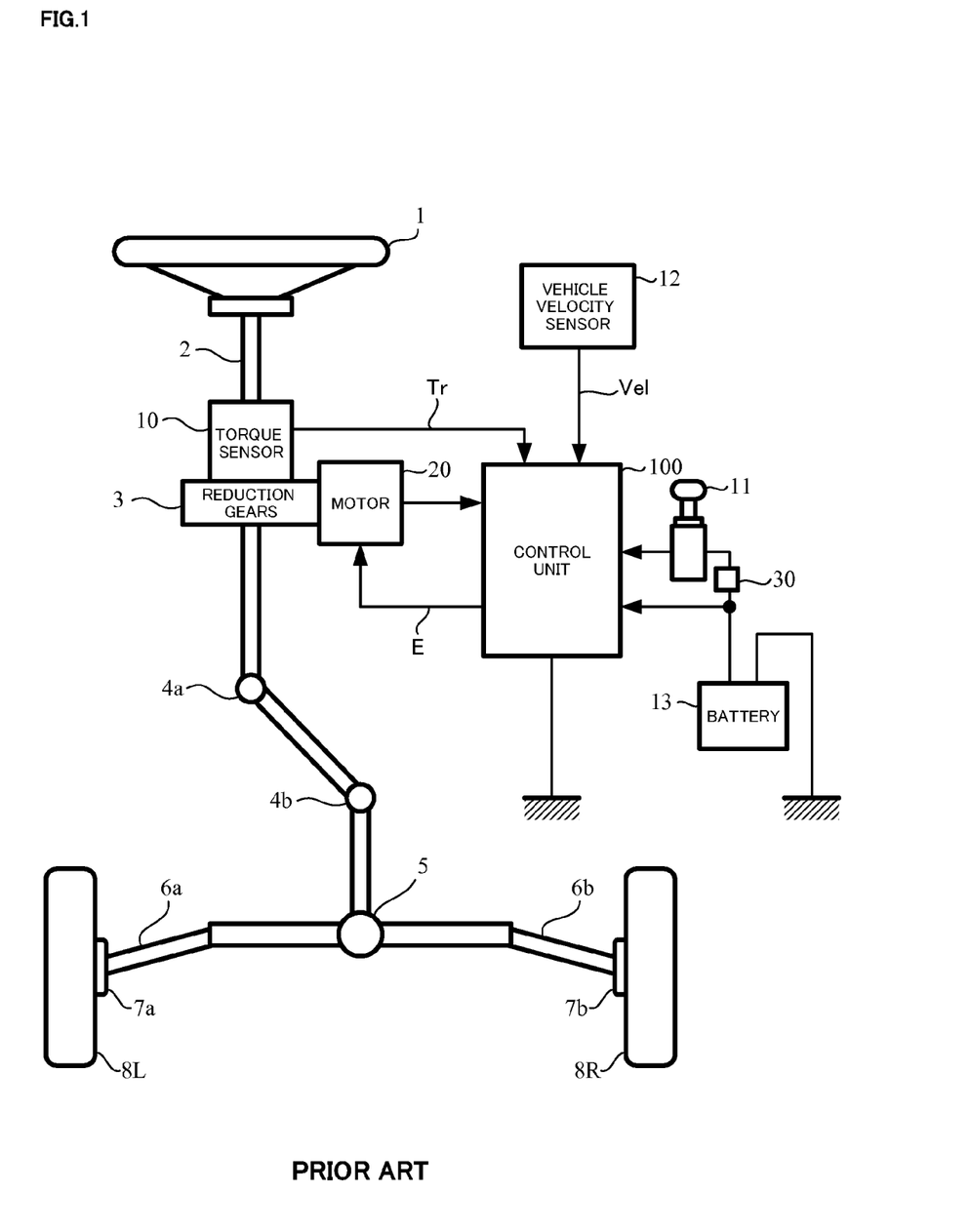
FIG. 1 is a configuration diagram illustrating a general outline of an electric power steering apparatus.

A general configuration of a conventional electric power steering apparatus will be described with reference to FIG. 1. As shown in FIG. 1, a column shaft (a steering shaft) 2 connected to a steering wheel (a steering handle) 1, is connected to steered wheels 8L and 8R through reduction gears 3, universal joints 4a and 4b, a rack and pinion mechanism 5, and tie rods 6a and 6b, further via hub units 7a and 7b. Further, the column shaft 2 is provided with a torque sensor 10 for detecting a steering torque of the steering wheel 1, and a motor 20 for assisting the steering force of the steering wheel 1 is connected to the column shaft 2 through the reduction gears 3. Electric power is supplied to a control unit 100 for controlling the electric power steering apparatus from a battery 13, and an ignition key signal is inputted into the control unit 100 through an ignition key 11. Further, in a vehicle with an idling stop function, the ignition key signal is inputted into the control unit 100 via a voltage stabilization circuit 30 and then through the ignition key 11. The control unit 100 calculates a steering assist command value of an assist (steering assist) command based on a steering torque Tr detected by the torque sensor 10 and a vehicle velocity Vel detected by a vehicle velocity sensor 12, and controls a current supplied to the motor 20 based on a current control value E obtained by performing compensation and so on with respect to the steering assist command value. Moreover, it is also possible to receive the vehicle velocity Vel from a CAN (Controller Area Network) and so on.

Figure 2:
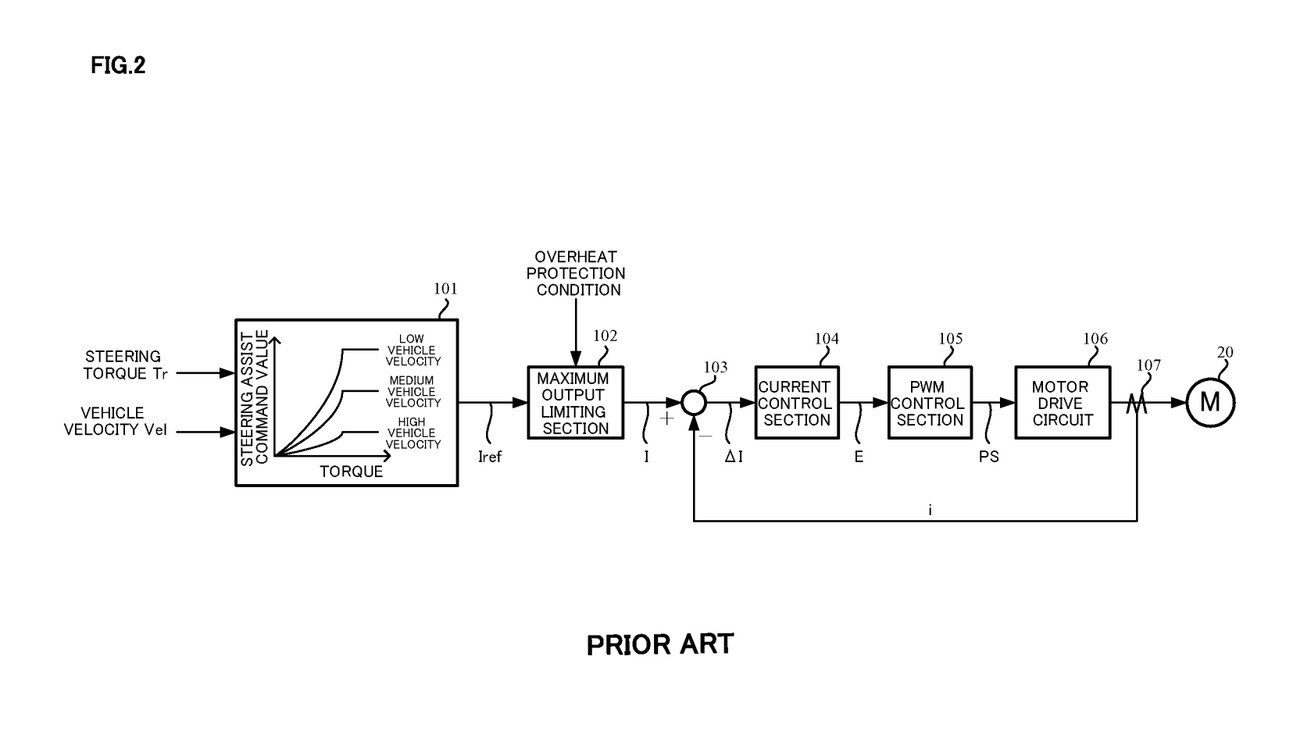
FIG. 2 is a block diagram showing a general configuration example of a control unit.

The control unit 100 mainly comprises a CPU (or an MPU or an MCU), and general functions performed by programs within the CPU are shown in FIG. 2.

Functions and operations of the control unit 100 will be described with reference to FIG. 2. As shown in FIG. 2, the steering torque Tr detected by the torque sensor 10 and the vehicle velocity Vel from the vehicle velocity sensor 12 are inputted into a steering assist command value calculating section 101, and a steering assist command value Iref is calculated by means of an assist map. The calculated steering assist command value Iref is inputted into a maximum output limiting section 102 and an output is limited based on an overheat protection condition or the like in the maximum output limiting section 102. A current command value I that maximum output is limited, is inputted into a subtracting section 103.

Moreover, with respect to the calculation of the steering assist command value Iref performed in the steering assist command value calculating section 101, it is also possible to calculate the steering assist command value Iref by using not only the steering torque Tr and the vehicle velocity Vel but also a steering angle.

The subtraction section 103 calculates a deviation ΔI (=I−i) between the current command value I and a motor current i of the motor 20 that is fed back, the deviation ΔI is controlled by a current control section 104 such as a PI control (proportional and integral control) or the like, the controlled current control value E is inputted into a PWM (Pulse Width Modulation) control section 105 and the duty ratio is calculated, and in accordance with a PWM-signal PS that the duty ratio is calculated, the motor 20 is driven through a motor drive circuit 106. The motor current i of the motor 20 is detected by a motor current detecting circuit 107, and the detected motor current i is inputted into the subtracting section 103 to feed back.

Figure 3:
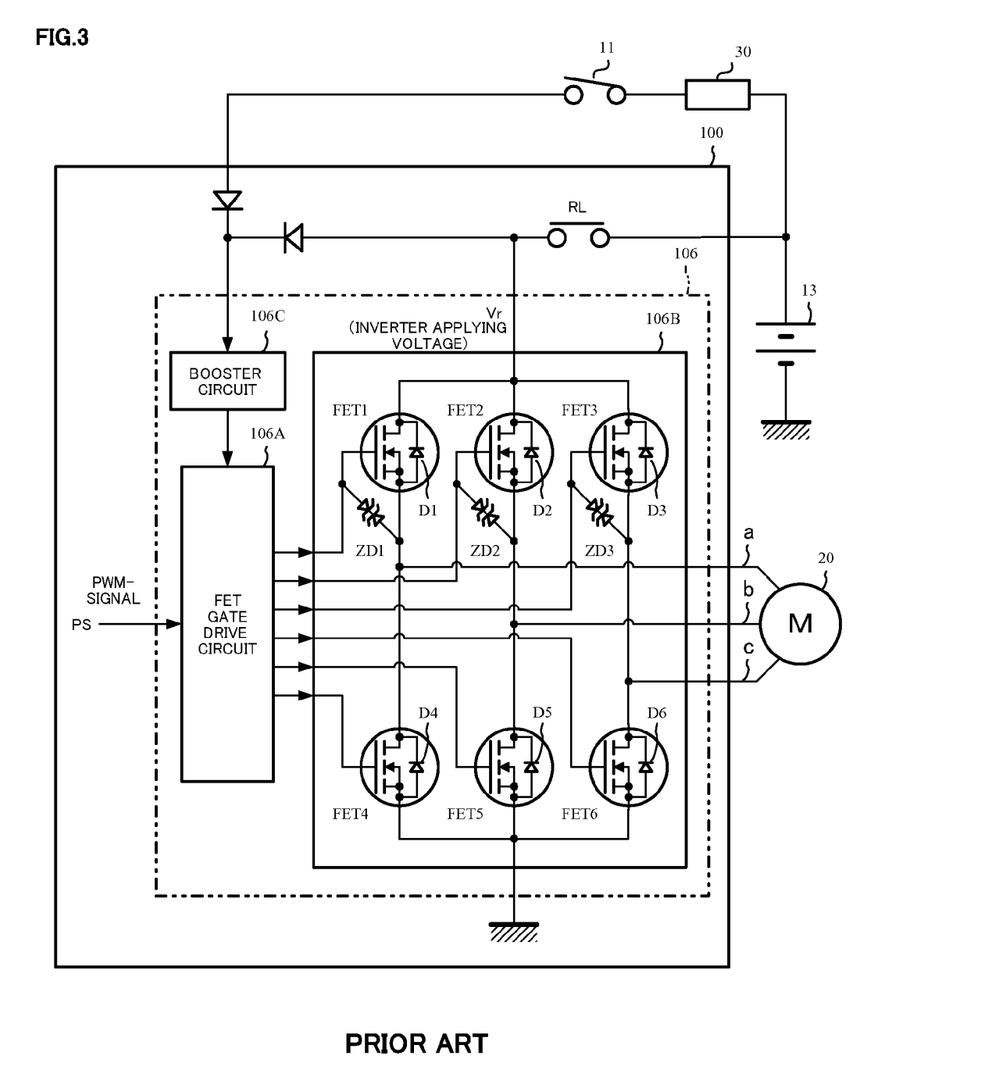
FIG. 3 is a wiring diagram showing a configuration example of a motor drive circuit.

A configuration example of the motor drive circuit 106 will be described with reference to FIG. 3. In the case of a three-phase motor, the motor drive circuit 106 comprises an FET gate drive circuit 106A that drives each gate of field-effect transistors (FET1 to FET6) based on the PWM-signal PS from the PWM control section 105, an inverter 106B comprising a three-phase bridge circuit of FET1 to FET6 and a booster circuit 106C that boosts high side FETs (FET1, FET2 and FET3). Further, with respect to FET1 to FET6, diodes D1 to D6 for surge absorbing are built between their respective sources and their respective drains in anti-parallel. Moreover, with respect to the high side FET1, FET2 and FET3, each pair of Zener diodes ZD1 to ZD3 for protecting gate is connected between their respective gates and their respective sources.

Electric power is supplied from the battery 13 as a power source to the inverter 106B through a power-source relay RL. The inverter 106B comprises an FET-array that the FET1 and the FET4 are connected in series, an FET-array that the FET2 and the FET5 are connected in series, and an FET-array that the FET3 and the FET6 are connected in series, and these three FET-arrays connected in series are connected in parallel. From a connecting point of the FET1 and the FET4 in the inverter 106B, a connecting point of the FET2 and the FET5 in the inverter 106B and a connecting point of the FET3 and the FET6 in the inverter 106B, each motor phase current is supplied to the motor 20 through supply routes "a", "b" and "c".

In such an electric power steering apparatus, the battery 13 supplies the electric power to loading apparatuses such as the control unit 100, the torque sensor 10, the motor 20 and so on. In order to assist steering operations of a driver to be stable normally, it is necessary to maintain the power-source voltage (the battery voltage) of the battery 13 in a given stable range (for example, 10V-15V). However, in a situation such as cranking, there is a possibility that the power-source voltage reduction occurs.

In a state that the power-source voltage dropped, the gate driving voltage of the FET used in the motor drive circuit 106 drops. In this case, when the voltage (VGS) from gate to source of the FET dropped, the drain-source on-state resistance (RDS (ON)) becomes large abruptly. For comparison, there is a relation such as the following Expression 1 between a maximum driving current Imax and an allowable power value Pa of the FET.

$$Pa = RDS(ON) \cdot Imax^2 \quad \text{[Expression 1]}$$

where, "Pa" is the allowable power value of the FET, "RDS(ON)" is the drain-source on-state resistance of the FET, and "Imax" is a motor maximum current that can pass in the FET.

From the relation of the above Expression 1, in the case of drive control of the motor 20, when the drain-source on-state resistance (RDS(ON)) of the FET becomes large, power loss also becomes large. Therefore, when the power-source voltage dropped, due to heat occurred by power loss of the FETs, the temperature increases. In addition, when the power-source voltage reduction continues, there is a possibility that a failure that the FET is damaged by burnout occurs.

Further, when the power-source voltage dropped dramatically and dropped to less than or equal to a minimum operating voltage of the torque sensor 10, the output of the torque sensor 10 descends, a neutral position of the steering wheel 1 becomes being off track, the current characteristic of the motor 20 also becomes being off track from the neutral position of the steering wheel 1. Therefore, there was such a problem, that is, a bilateral difference of the steering force of the steering wheel occurs, when the bilateral difference becomes abysmal, a trouble such as "the steering wheel is taken" occurs, the steering feeling becomes bad. That is to say, when the power-source voltage becomes less than or equal to a certain voltage value, the torque sensor 10 cannot work normally.

Accordingly, when the power-source voltage dropped, in order to keep a good steering feeling, it is necessary to limit or shut down the assist control. In order to solve such a problem, in Patent Document 1 (Japanese Published Unexamined Patent Application No.2005-193751 A), an electric power steering apparatus that limits the assist amount by means of a variable limitation value in accordance with the power-source voltage in the case of the power-source voltage drop, is proposed. Further, in Patent Document 2 (Japanese Published Unexamined Patent Application No. 2007-290429 A), an electric power steering apparatus that comprises semiconductor switching elements with a low on-state resistance at a time of low voltage, when the power-source voltage is more than or equal to a lower limit of the operation voltage, performs the control of the motor, and when the power-source voltage is less than the operation voltage, shuts down the control of the motor, is proposed.

THE LIST OF PRIOR ART DOCUMENTS

Patent Documents

Patent Document 1: Japanese Published Unexamined Patent Application No. 2005-193751 A Patent Document 2: Japanese Published Unexamined Patent Application No. 2007-290429 A

SUMMARY OF THE INVENTION

Problems to be Solved by the Invention

However, recently as a demand from the viewpoint of environmental protection, vehicles with a so-called idling stop function (i.e. shutting down the engine during the stop of the vehicle or when the vehicle is parked) increase. In such vehicles (also including vehicles that the engine starts in running of the vehicle such as a hybrid vehicle), in order to restart the engine that shut down, cranking is carried out frequently. Then, in the case of the cranking, a variation in the power-source voltage is considerably intense, and there is a possibility that the power-source voltage becomes beyond the assist possible voltage, in such a case, there is a possibility that the assist shuts down abruptly. When shutdown of the assist occurs, there is a possibility that steering behaviors such as kickback and abnormal noises occur, and largely affecting quality of the whole electric power steering apparatus.

In the electric power steering apparatus of Patent Document 1, since varying the assist level by means of the value of the power-source voltage till reaching the operating limit voltage, there is a feature capable of performing a smooth assist control. However, since shutting down the assist control when the power-source voltage dropped to less than or equal to an assist shutdown voltage, in the case that there is a possibility that the power-source voltage drops to a considerably low level such as cranking, there is a problem that cannot apply the electric power steering apparatus disclosed in Patent Document 1.

Further, although the electric power steering apparatus of Patent Document 2 reduces the heating amount by using FETs with a low on-state resistance at a time of low voltage and works even in a low voltage, there is a possibility that the voltage drop occurs in the cranking, the variation is large, when the power-source voltage is less than the operation voltage of the torque sensor, the control become unstable.

In the case that an ignition voltage of an electric power steering apparatus mounted on a vehicle with the idling stop function is compensated by boosting the voltage drop at the time of restart of the engine by means of the voltage stabilization circuit so as to reach a certain voltage, when restarting the engine, a voltage potential difference occurs between the battery voltage and the ignition voltage due to the battery voltage drop.

A voltage obtained by boosting the ignition voltage by means of the booster circuit 106C is applied to gate terminals of high side the FET1, the FET2 and the FET3, and an inverter applying voltage corresponding to the battery voltage is applied to source terminals of high side the FET1, the FET2 and the FET3. Hence, the voltage from gate to source becomes large so that the battery voltage drops, and voltages that are applied to the Zener diodes ZD1 to ZD3 for protecting gate connected between gate and source also become large. When the voltages that are applied to the Zener diodes ZD1 to ZD3 exceed Zener voltage, since the current flows and self-heating occurs, it is necessary to suppress the self-heating by limiting the duty ratio of the PWM-signal and shortening on-state time of high side the FET1, the FET2 and the FET3 or increase rated electric power of the Zener diodes ZD1 to ZD3.

In response, since Patent Document 1 limits assist in accordance with the power-source voltage, there is a problem that it is impossible to effectively suppress the self-heating of the Zener diodes. When increasing the rated electric power of the Zener diodes, a problem that cost increases with growing in size and mountability gets worse occurs.

The present invention has been developed in view of the above-described circumstances, and an object of the present invention is to provide an electric power steering apparatus that certainly protects Zener diodes that are built into a drive circuit without increasing the rated electric power of the Zener diodes and further without impairing steering performances by time-integrating a loss power of the Zener diodes and limiting a duty ratio with an increase in an integrating loss even though a power-source voltage varies drastically and drops due to cranking or the like.

Means for Solving the Problems

The present invention relates to an electric power steering apparatus that calculates a steering assist command value based on a steering torque and a vehicle velocity, generates a PWM-signal based on said steering assist command value, PWM-drives a motor through an FET bridge circuit having Zener diodes for protecting FETs, and performs an assist control of a steering system by a PWM-drive control of said motor, the above-described object of the present invention is achieved by that comprising: a loss power calculating section that calculates a loss power of said Zener diodes when a difference between an ignition voltage and an inverter applying voltage is equal to or more than a predetermined voltage; an integrating loss calculating section to calculate an integrating loss of said loss power; a permissible loss calculating section to calculate a permissible loss of said Zener diodes based on a temperature; a minimum value selecting section to select a minimum value of a loss difference of said permissible loss and said integrating loss; and a limit value calculating section to calculate a limit value of said PWM-signal based on said minimum value of said loss difference and said permissible loss.

Further, the above-described object of the present invention is more effectively achieved by that wherein further comprising a rate limiter to limit a rate of said limit value; or wherein after said difference becomes equal to or more than said predetermined voltage, said integrating loss of said integrating loss calculating section is cleared to "0" when a progress time after said difference becomes less than said predetermined voltage becomes a predetermined time; or wherein said limit value calculating section outputs said limit value with a proportional relation to said minimum value of said loss difference; or wherein as said temperature raises up, an output characteristic gain of said limit value calculating section increases.

Effects of the Invention

According to the electric power steering apparatus of the present invention, it is possible to realize protecting of the Zener diodes without impairing the steering performances by time-integrating the loss power of the Zener diodes mounted on the inverter of the motor drive circuit and limiting the duty ratio with the increase in the integrating loss and further using a temperature as a parameter even though the power-source voltage (the battery voltage) varies drastically (drops) due to cranking or the like. Since the present invention limits the duty ratio, also it is not necessary to increase the rated electric power of the Zener diodes.

Further, in the case that the power-source voltage returns during the engine operation after cranking and the difference between the ignition voltage and the battery voltage becomes smaller than a predetermined voltage, since the present invention removes limiting of the duty ratio by gradually changing, there is also no impairing the steering performances. Moreover, in the case that a progress time after the difference between the ignition voltage and the battery voltage becomes less than the predetermined voltage passes over the predetermined time, since the present invention clears the integrating loss to "0" as a result that the self-heating temperature of the Zener diodes decreased, it is possible to correctly associate the integrating loss with the self-heating temperature.

BRIEF DESCRIPTION OF THE DRAWINGS

In the accompanying drawings.

MODE FOR CARRYING OUT THE INVENTION

In the case that an ignition voltage of an electric power steering apparatus mounted on a vehicle with an idling stop function is compensated by boosting a voltage drop at a time of restart of an engine by means of a voltage stabilization circuit so as to reach a certain voltage, when restarting the engine, a voltage potential difference occurs between a battery voltage and an ignition voltage due to the battery voltage drop. Then, the voltage obtained by boosting the ignition voltage is applied to gate terminals of high side FETs of a FET bridge circuit that configures an inverter, the inverter applying voltage corresponding to a power-source voltage is applied to source terminals of the high side FETs, the voltage from gate to source becomes large so that the power-source voltage drops, and the voltages that are applied to Zener diodes for protecting gate connected between gate and source also become large.

When voltages that are applied to the Zener diodes exceed the Zener voltage, a current flows and self-heating occurs. When increasing a rated electric power of the Zener diodes, since there is a problem that a cost increases with growing in size and mountability gets worse, the present invention suppresses the self-heating by limiting the duty ratio and shortening an on-state time of the high side FETs when the difference between the ignition voltage and the power-source voltage becomes equal to or more than the predetermined voltage. Therefore, it is not necessary to increase the rated electric power of the Zener diodes, and it is possible to use inexpensive Zener diodes being small in size.

Moreover, in the case that the power-source voltage returns during the engine operation after cranking and the difference between the ignition voltage and the inverter applying voltage becomes smaller than the predetermined voltage, the present invention removes limiting of the duty ratio by gradually changing so as not to impair the steering performances. Further, in the case that the predetermined time lapsed, since the present invention clears the integrating loss to "0", it is possible to correctly associate the integrating loss with the self-heating temperature.

Hereinafter, an embodiment of the present invention will be described in detail with reference to the accompanying drawings.

Figure 4:
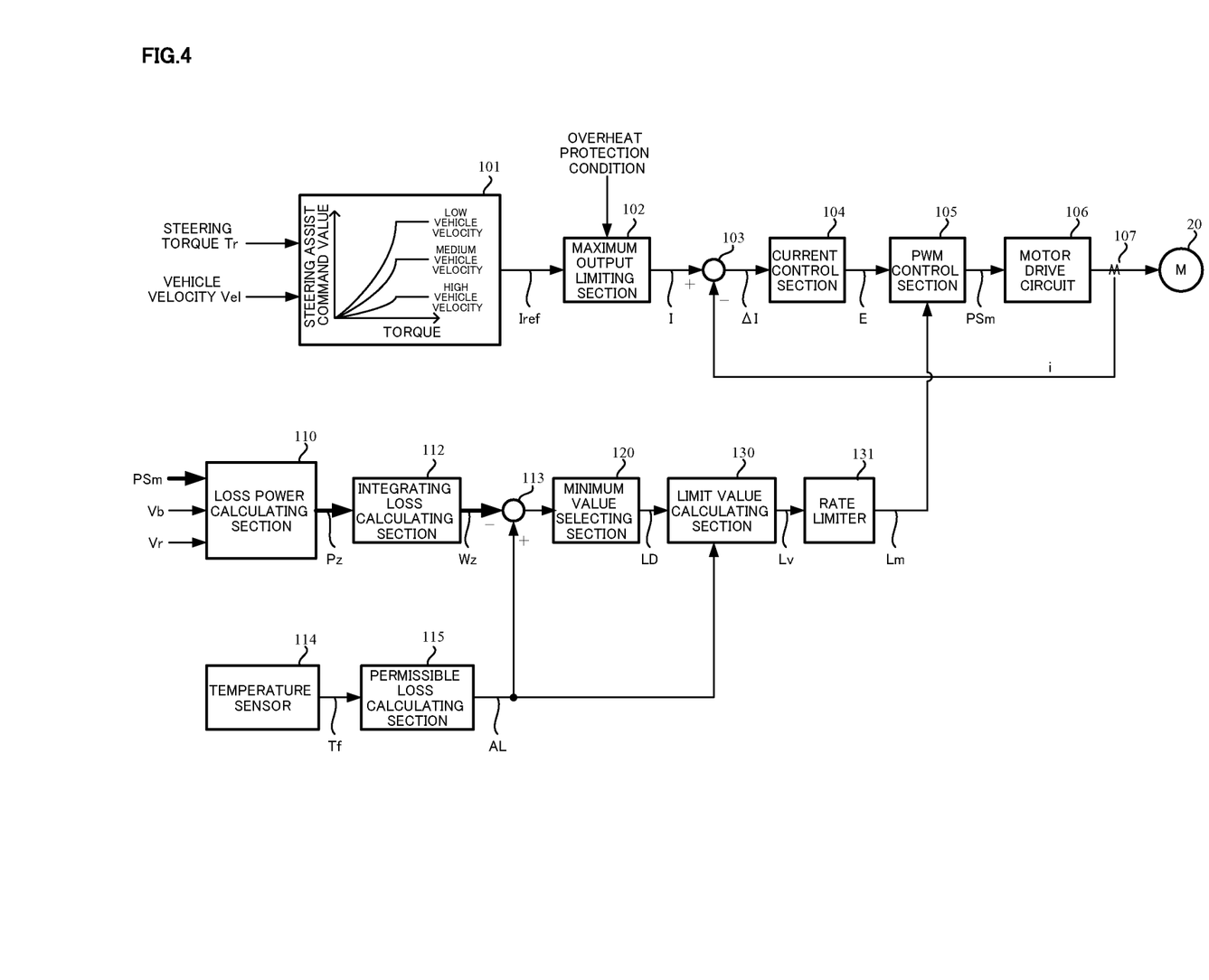
FIG. 4 is a block diagram showing a configuration example of a control unit according to an embodiment of the present invention.

FIG. 4 is a block diagram showing a configuration example of a control unit 100 of an electric power steering apparatus according to the present invention. Since FIG. 4 is shown as corresponding to the above-described FIG. 2, with respect to identical configurations (members), identical reference numerals are given without adding explanations.

The control unit 100 according to this embodiment is newly provided with a loss power calculating section 110 that calculates each-phase loss power Pz of three phases, an integrating loss calculating section 112 that calculate an integrating loss Wz of the each-phase loss power of three phases, a temperature sensor 114 that measures an ambient temperature Tf, a permissible loss calculating section 115 that calculates a permissible loss AL based on the measured temperature Tf, a subtracting section 113 that subtracts the integrating loss Wz from the permissible loss AL, a minimum value selecting section 120 that selects a minimum value LD of a loss difference of the permissible loss AL and the integrating loss Wz from three phases and outputs the minimum value LD of the loss difference, a limit value calculating section 130 that calculates a limit value Lv of the duty ratio based on the selected loss difference LD of the minimum value and the permissible loss AL, and a rate limiter 131 that limits (gradually changes) an addition-subtraction speed (a rate) of the limit value Lv. A limit value Lm that the rate is limited by the rate limiter 131 is inputted into the PWM control section 105, and a PWM-signal PSm that the duty ratio is limited is outputted from the PWM control section 105.

The PWM-signal PSm of three phases, the ignition voltage Vb and the inverter applying voltage Vr are inputted into the loss power calculating section 110. The loss power calculating section 110 calculates the loss power Pz of each-phase Zener diodes (DZ1 to DZ3) based on the PWM-signal PSm, the ignition voltage Vb and the inverter applying voltage Vr, and outputs the calculated each-phase loss power Pz. Only when a self-heating condition of the Zener diode holds, that is, only when "the ignition voltage Vb−the inverter applying voltage Vr≥a predetermined voltage Vc" holds, the loss power calculating section 110 calculates the loss power Pz and outputs the calculated loss power Pz. When the above-described self-heating condition does not hold, since the loss power Pz does not occur, the loss power calculating section 110 outputs "0".

The integrating loss calculating section 112 calculates the integrating loss Wz by adding the present current (sampling) loss power Pz and the previous (sampling) loss power Pz($Z^{-1}$) and subtraction-inputs the integrating loss Wz obtained by calculation into the subtracting section 113. That is to say, the integrating loss calculating section 112 time-integrates the loss power Pz, and calculates the integrating loss Wz of the Zener diodes in accordance with the following Expression 2.

$$Wz = \Sigma Pz \cdot \Delta t \qquad \text{[Expression 2]}$$

where, $\Delta t$ is a processing time.

In the case that a time that "the ignition voltage Vb−the inverter applying voltage Vr<the predetermined voltage Vc" holds continues during a predetermined time ($T_0$), since it is possible to judge that the temperature caused by the self-heating of the Zener diodes dropped, the integrating loss Wz is cleared to "0".

The permissible loss calculating section 115 calculates the permissible loss AL of the Zener diodes depending on the measured temperature Tf. Although the permissible loss of the Zener diodes is determined by the degree of permissible temperature rise, when the ambient temperature changes, since the permissible temperature rise of the Zener diodes also changes, it is necessary to calculate the permissible loss AL depending on the ambient temperature Tf. The calculated permissible loss AL is addition-inputted into the subtracting section 113.

The subtracting section 113 subtracts the integrating loss Wz (three phases) from the permissible loss AL calculated by the permissible loss calculating section 115, and inputs results of subtraction (loss differences) into the minimum value selecting section 120. The minimum value selecting section 120 selects a loss difference of a minimum value among three phases and outputs the selected loss difference of the minimum value as the loss difference LD.

Figure 5:
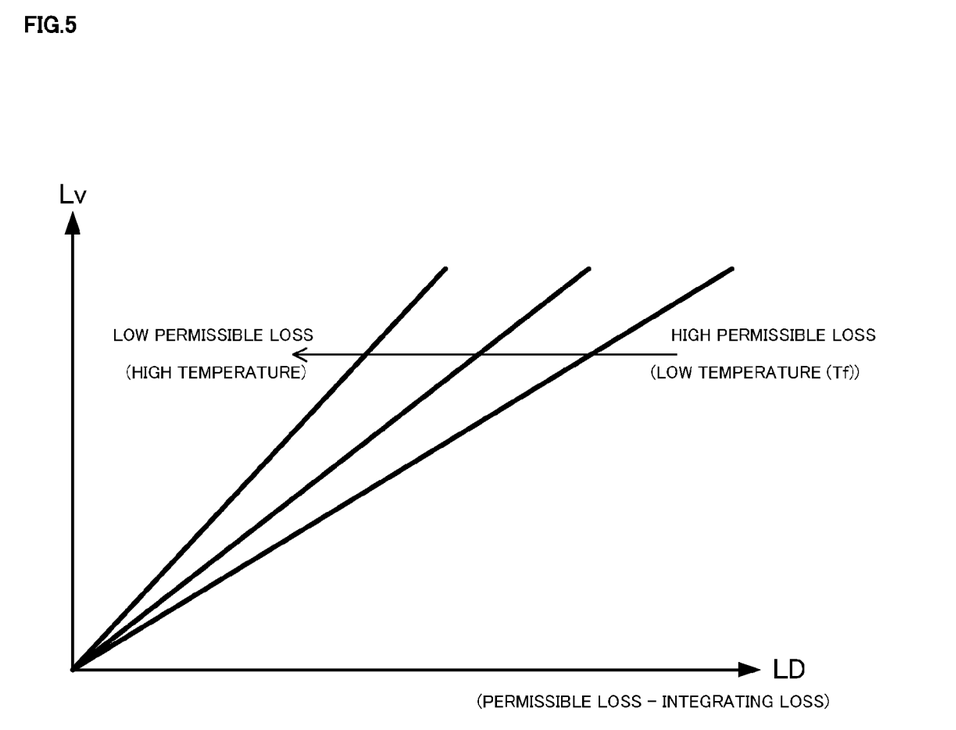
FIG. 5 is a characteristic diagram showing one example of characteristics of a limit value calculating section used in the preset invention.

The limit value calculating section 130 calculates the limit value Lv of the duty ratio based on the loss difference LD of the minimum value selected by the minimum value selecting section 120 and the permissible loss AL. As shown in FIG. 5, the calculation of the limit value Lv becomes linear with respect to the loss difference LD, and the limit value Lv is outputted by increasing the gain characteristic as the permissible loss AL becomes low. Only when the self-heating condition of the Zener diode holds, that is, only when "the ignition voltage Vb−the inverter applying voltage Vr≥the predetermined voltage Vc" holds, the limit value calculating section 130 calculates the limit value Lv and outputs the calculated limit value Lv. When the above-described self-heating condition does not hold, since the loss power Pz does not occur, the limit value calculating section 130 outputs the duty ratio 100% (the limit value Lv=0).

In removing limiting of the duty ratio, in order to suppress a steering uncomfortable feeling, the rate limiter 131 gradually changes.

Figure 6:
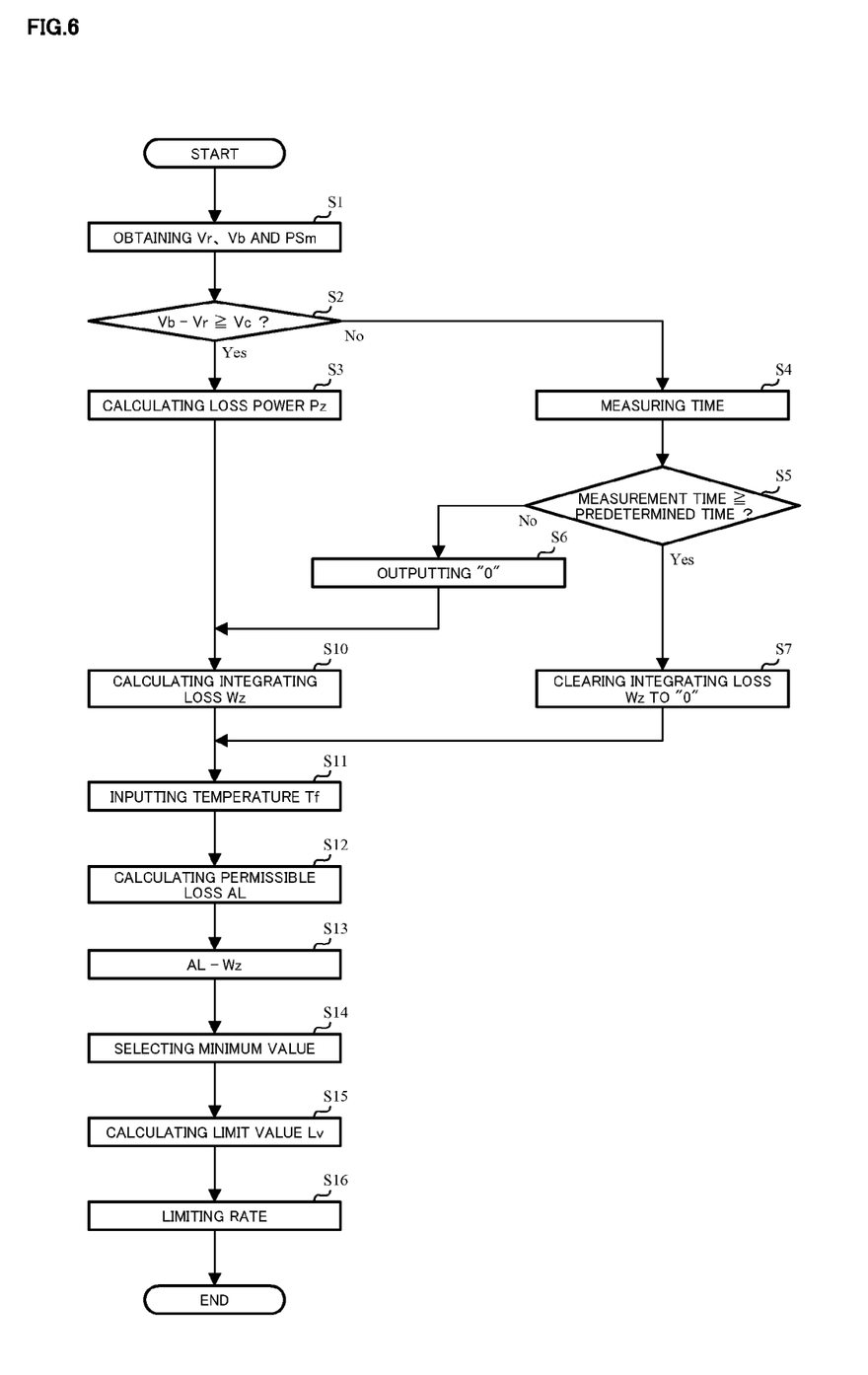
FIG. 6 is a flowchart showing an operating example of the present invention.

In such a configuration, that operating example will be described with reference to the flowchart of FIG. 6.

When the ignition key 11 of the vehicle is turned on, the ignition voltage Vb is measured and inputted, the inverter applying voltage Vr is measured and inputted, and simultaneously the PWM-signal PSm is inputted (Step S1). Then, determining whether "the ignition voltage Vb−the inverter applying voltage Vr" is equal to or more than the predetermined voltage Vc or not (Step S2), in the case that "the ignition voltage Vb−the inverter applying voltage Vr" is equal to or more than the predetermined voltage Vc, the loss power calculating section 110 calculates the loss power Pz based on the ignition voltage Vb, the inverter applying voltage Vr and the PWM-signal PSm (step S3), and the integrating loss calculating section 112 calculates the integrating loss Wz based on the loss power Pz (Step S10).

Next, the temperature Tf measured by the temperature sensor 114 is inputted (Step S11), the permissible loss calculating section 115 calculates the permissible loss AL based on the temperature Tf (Step S12), and the subtracting section 113 calculates "the permissible loss AL−the integrating loss Wz" with respect to each phase (Step S13). The subtraction results of "the permissible loss AL−the integrating loss Wz" are inputted into the minimum value selecting section 120, and the loss difference LD of the minimum value among three phases is selected and outputted (Step S14). The selected loss difference LD is inputted into the limit value calculating section 130, and the limit value calculating section 130 calculates the limit value Lv by setting the temperature Tf as a parameter and by using the characteristic proportional to the loss difference LD shown in FIG. 5 (Step S15). The calculated limit value Lv is gradually changed and processed by the rate limiter 131 (Step S16), and the gradually-changed limit value Lm is inputted into the PWM control section 105 and PWM-controlled.

On the other hand, at the above Step S2, in the case of determining that "the ignition voltage Vb−the inverter applying voltage Vr" is smaller than the predetermined voltage Vc, a progress time from that point of time is measured (Step S4), when the progress time becomes equal to or more than the predetermined time $T_0$ (Step S5), the integrating loss Wz of the integrating loss calculating section 112 is cleared to "0" (Step S7), skipping to the above Step S11. Further, in the above Step S5, in the case that the progress time is less than the predetermined time $T_0$, "0" is outputted and skipping to the above Step S10 (Step S6).

Figure 7:
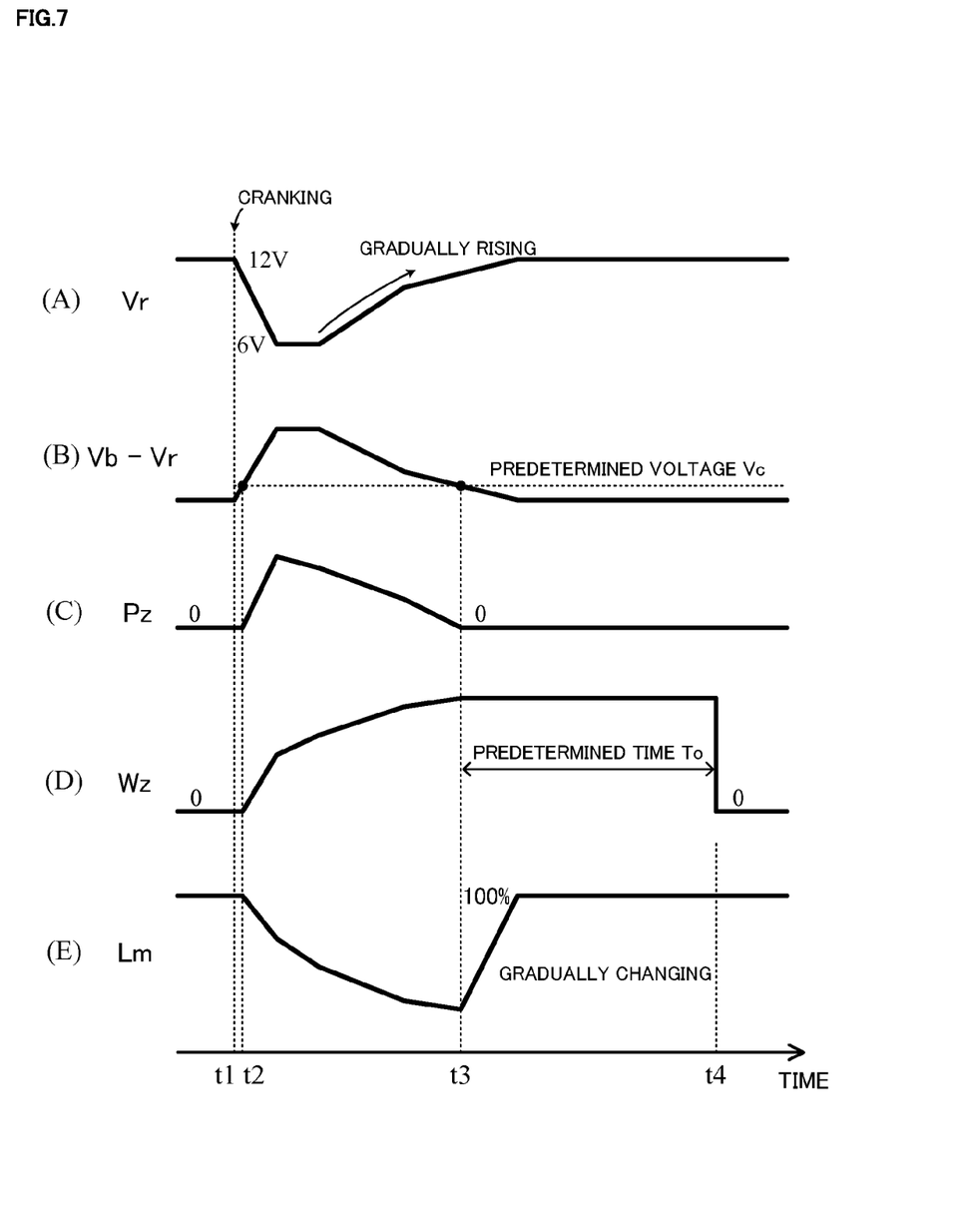
FIG. 7 is a time chart showing an operating example of the present invention.

FIGS. 7(A) to 7(E) show one operating example of the present invention. FIG. 7(A) shows a changing state of the inverter applying voltage Vr, and FIG. 7(B) shows a changing state of "the ignition voltage Vb−the inverter applying voltage Vr" by means of a relation with the predetermined voltage Vc. Further, FIG. 7 (C) shows the loss power Pz, FIG. 7(D) shows the integrating loss Wz, and FIG. 7(E) shows the limit value Lm of the duty ratio.

At a time point t1, becoming cranking, when the inverter applying voltage Vr changes (drops) as shown in FIG. 7(A), "the ignition voltage Vb−the inverter applying voltage Vr" changes (rises) as shown in FIG. 7(B), at a time point t2, the difference "Vb−Vr" becomes the predetermined voltage Vc. After the time point t2 that the difference "Vb−Vr" becomes the predetermined voltage Vc, the inverter applying voltage Vr further drops, and simultaneously the difference "Vb−Vr" rises, the loss power Pz and the integrating loss Wz rise (FIGS. 7(C) and (D)), and the limit value Lm drops. Then, the inverter applying voltage Vr stops dropping at a certain value (for example, 6V) and gradually shifts to rise after holding the certain value (FIG. (A)). In response to such a change in the inverter applying voltage Vr, the difference "Vb−Vr" stops rising at a certain value as shown in FIG. 7(B), gradually drops after holding the certain value, and finally at a time point t3, the difference "Vb−Vr" becomes the predetermined voltage Vc. After the time point t3, the calculation of the loss power Pz is stopped (FIG. 7(C)), at a time point t4 that the predetermined time $T_0$ lapsed, the integrating loss Wz of the integrating loss calculating section 112 is cleared to "0", and then the loss calculation is stopped (FIG. 7(D)). Further, after the time point t3 that the difference "Vb−Vr" becomes the predetermined voltage Vc, the limit value Lm is gradually changed as shown in FIG. 7(E) and finally becomes 100%.

Moreover, although the above-described embodiment described a three-phase motor, with respect to motors having other number of phases, in the same way, it is also possible to apply the present invention. Further, although the limit value calculating section 130 shows the example (FIG. 5) of the limit value Lv proportional to the loss difference LD, it is also possible for the limit value calculating section 130 to use a non-linear function characteristic. Furthermore, it is possible to arbitrarily change input timing of the ignition voltage Vb, the inverter applying voltage Vr, the temperature Tf, the steering torque Tr and the vehicle velocity Vel.

EXPLANATION OF REFERENCE NUMERALS 1 steering handle (steering wheel)
10 torque sensor
12 vehicle velocity sensor
13 battery
20 motor
30 voltage stabilization circuit
100 control unit
101 steering assist command value calculating section
102 maximum output limiting section
103, 113 subtracting section
104 current control section
105 PWM control section
106 motor drive circuit
107 motor current detecting circuit
110 loss power calculating section
112 integrating loss calculating section
114 temperature sensor
115 permissible loss calculating section
120 minimum value selecting section
130 limit value calculating section
131 rate limiter

The invention claimed is:

1. An electric power steering apparatus that calculates a steering assist command value based on a steering torque and a vehicle velocity, generates a Pulse Width Modulation (PWM) signal based on said steering assist command value, PWM-drives a motor through a Field-Effect Transistor (FET) bridge circuit having Zener diodes for protecting FETs, and performs an assist control of a steering system by a PWM-drive control of said motor, comprising:
   a loss power calculating section that inputs said PWM-signal, an ignition voltage and an inverter applying voltage, calculates a loss power of said Zener diodes when a difference between said ignition voltage and said inverter applying voltage is equal to or more than a predetermined voltage, and outputs said loss power;
   an integrating loss calculating section to calculate an integrating loss of said loss power;
   a permissible loss calculating section to calculate a permissible loss of said Zener diodes based on a detected temperature of a temperature sensor for measuring an ambient temperature;
   a minimum value selecting section to select a minimum value of a loss difference of said permissible loss and said integrating loss;
   a limit value calculating section to calculate a limit value of said PWM-signal based on said minimum value of said loss difference and said permissible loss; and
   a rate limiter to limit a rate of said limit value.

2. An electric power steering apparatus according to claim 1, wherein after said difference becomes equal to or more than said predetermined voltage, said integrating loss of said integrating loss calculating section is cleared to "0" when a progress time after said difference becomes less than said predetermined voltage becomes to a predetermined time.

3. An electric power steering apparatus according to claim 2, wherein said limit value calculating section outputs said limit value with a proportional relation to said minimum value of said loss difference.

4. An electric power steering apparatus according to claim 3, wherein as said detected temperature raises up, an output characteristic gain of said limit value calculating section increases.

5. An electric power steering apparatus according to claim 1, wherein said limit value calculating section outputs said limit value with a proportional relation to said minimum value of said loss difference.

6. An electric power steering apparatus according to claim 5, wherein as said detected temperature raises up, an output characteristic gain of said limit value calculating section increases.

7. An electric power steering apparatus that calculates a steering assist command value based on a steering torque and a vehicle velocity, generates a Pulse Width Modulation (PWM) signal based on said steering assist command value, PWM-drives a motor through a Field-Effect Transistor (FET) bridge circuit having Zener diodes for protecting FETs, and performs an assist control of a steering system by a PWM-drive control of said motor, comprising:
   a loss power calculating section that inputs said PWM-signal, an ignition voltage and an inverter applying voltage, calculates a loss power of said Zener diodes when a difference between said ignition voltage and said inverter applying voltage is equal to or more than a predetermined voltage, and outputs said loss power;
   an integrating loss calculating section to calculate an integrating loss of said loss power;
   a permissible loss calculating section to calculate a permissible loss of said Zener diodes based on a detected temperature of a temperature sensor for measuring an ambient temperature;
   a minimum value selecting section to select a minimum value of a loss difference of said permissible loss and said integrating loss; and
   a limit value calculating section to calculate a limit value of said PWM-signal based on said minimum value of said loss difference and said permissible loss,
   wherein after said difference becomes to equal to or more than said predetermined voltage, said integrating loss of said integrating loss calculating section is cleared to "0" when a progress time after said difference becomes less than said predetermined voltage becomes to a predetermined time.

8. An electric power steering apparatus according to claim 7, wherein said limit value calculating section outputs said limit value with a proportional relation to said minimum value of said loss difference.

9. An electric power steering apparatus according to claim 8, wherein as said detected temperature raises up, an output characteristic gain of said limit value calculating section increases.

10. An electric power steering apparatus that calculates a steering assist command value based on a steering torque and a vehicle velocity, generates a Pulse Width Modulation (PWM) signal based on said steering assist command value, PWM-drives a motor through a Field-Effect Transistor (FET) bridge circuit having Zener diodes for protecting FETs, and performs an assist control of a steering system by a PWM-drive control of said motor, comprising:
   a loss power calculating section that inputs said PWM-signal, an ignition voltage and an inverter applying voltage, calculates a loss power of said Zener diodes when a difference between said ignition voltage and said inverter applying voltage is equal to or more than a predetermined voltage, and outputs said loss power;
   an integrating loss calculating section to calculate an integrating loss of said loss power;
   a permissible loss calculating section to calculate a permissible loss of said Zener diodes based on a detected temperature of a temperature sensor for measuring an ambient temperature;
   a minimum value selecting section to select a minimum value of a loss difference of said permissible loss and said integrating loss; and
   a limit value calculating section to calculate a limit value of said PWM-signal based on said minimum value of said loss difference and said permissible loss,
   wherein said limit value calculating section outputs said limit value with a proportional relation to said minimum value of said loss difference.

11. An electric power steering apparatus according to claim 10, wherein as said detected temperature raises up, an output characteristic gain of said limit value calculating section increases.

* * * * *